United States Patent
Conti et al.

(10) Patent No.: US 10,052,926 B2
(45) Date of Patent: Aug. 21, 2018

(54) REGENERATIVE HYDRAULIC SHOCK-ABSORBER FOR VEHICLE SUSPENSION

(71) Applicants: SISTEMI SOSPENSIONI S.p.A., Corbetta (IT); MAGNETI MARELLI S.p.A., Corbetta (IT)

(72) Inventors: Piero Antonio Conti, Asti (IT); Giordano Greco, Turin (IT); Andrea Nepote, Turin (IT); Francesco Inglese, Grottaminardo (IT); Mario Milazzo, Rocca Massima (IT); Cesare Stefanini, Cascina (IT)

(73) Assignees: SISTEMI SOSPENSIONI S.p.A., Corbetta (IT); MAGNETI MARELLI S.p.A., Corbetta (IT)

( * ) Notice: Subject to any disclaimer, the term of this patent is extended or adjusted under 35 U.S.C. 154(b) by 0 days.

(21) Appl. No.: 15/537,143

(22) PCT Filed: Nov. 12, 2015

(86) PCT No.: PCT/IB2015/058746
§ 371 (c)(1),
(2) Date: Jun. 16, 2017

(87) PCT Pub. No.: WO2016/097898
PCT Pub. Date: Jun. 23, 2016

(65) Prior Publication Data
US 2018/0001728 A1    Jan. 4, 2018

(30) Foreign Application Priority Data

Dec. 19, 2014    (IT) .............................. TO2014A1077

(51) Int. Cl.
*F02B 63/04* (2006.01)
*H02K 7/18* (2006.01)
(Continued)

(52) U.S. Cl.
CPC .............. *B60G 13/14* (2013.01); *B60K 25/10* (2013.01); *F16F 9/185* (2013.01); *F16F 9/19* (2013.01);
(Continued)

(58) Field of Classification Search
USPC .................. 290/1 A; 188/280; 324/207, 635; 60/413; 95/5 R
See application file for complete search history.

(56) References Cited

U.S. PATENT DOCUMENTS 2,934,175 A * 4/1960 Schnitzer ................ F16F 7/082
188/1.11 E
3,225,541 A * 12/1965 Piret ........................ B23Q 5/26
60/911

(Continued)

FOREIGN PATENT DOCUMENTS

DE    102008030577 A1    1/2009
EP    1878598 A1    1/2008
(Continued)

OTHER PUBLICATIONS

International Search Report and Written Opinion of the International Searching Authority for PCT International Application No. PCT/IB2015/058746 dated Mar. 18, 2016 (9 pages).
(Continued)

*Primary Examiner* — Pedro J Cuevas
(74) *Attorney, Agent, or Firm* — Howard & Howard Attorneys PLLC

(57) ABSTRACT

The shock-absorber comprises: a cylinder containing a hydraulic working fluid; a piston slidably arranged in the cylinder so as to split the cylinder into two variable-volume working chambers, namely a first working chamber, or extension chamber, and a second working chamber, or compression chamber; an auxiliary conduit in fluid commu-
(Continued)

nication on one side with the first working chamber and on the other with the second working chamber; a train of permanent magnets slidably arranged in the auxiliary conduit so as to reciprocally move along the auxiliary conduit, dragged by the working fluid flowing between the first and second working chambers through the auxiliary conduit as a result of the reciprocating motion of the piston in the cylinder; and electric energy generating device for generating electric energy by exploiting the movement of the train of permanent magnets along the auxiliary conduit.

21 Claims, 7 Drawing Sheets

(51) Int. Cl.
| | |
|---|---|
| B60G 13/14 | (2006.01) |
| B60K 25/10 | (2006.01) |
| F16F 9/19 | (2006.01) |
| F16F 9/18 | (2006.01) |
| H02K 35/02 | (2006.01) |
| H02K 7/06 | (2006.01) |
| H02K 49/10 | (2006.01) |
| H02P 9/00 | (2006.01) |
| F16F 9/49 | (2006.01) |

(52) U.S. Cl.
CPC ............ *H02K 7/06* (2013.01); *H02K 7/1876* (2013.01); *H02K 35/02* (2013.01); *H02K 49/102* (2013.01); *H02P 9/008* (2013.01); B60G 2206/41 (2013.01); B60G 2300/60 (2013.01); B60K 2025/103 (2013.01); H02K 2207/00 (2013.01)

(56) References Cited

U.S. PATENT DOCUMENTS

| | | | | | |
|---|---|---|---|---|---|
| 3,318,793 | A * | 5/1967 | Webb | ............... | B23H 7/18 204/224 M |
| 3,425,218 | A * | 2/1969 | Attebo | ............... | F15B 11/02 417/299 |
| 4,749,936 | A * | 6/1988 | Taplin | ............... | G01D 5/243 318/669 |
| 4,821,849 | A * | 4/1989 | Miller | ............... | B60G 17/018 188/280 |
| 4,896,584 | A * | 1/1990 | Stoll | ............... | F15B 15/1414 91/DIG. 4 |
| 5,231,352 | A * | 7/1993 | Huber | ............... | G01D 5/145 324/207.13 |
| 5,464,079 | A * | 11/1995 | Lohberg | ............... | B60G 17/08 188/280 |
| 5,704,268 | A * | 1/1998 | Hinchliffe | ............... | F15B 13/16 91/1 |
| 5,710,514 | A * | 1/1998 | Crayton | ............... | F15B 15/28 324/635 |
| 5,901,633 | A * | 5/1999 | Chan | ............... | F15B 15/28 92/5 R |
| 5,977,778 | A * | 11/1999 | Chan | ............... | F15B 15/2815 324/635 |
| 6,119,579 | A * | 9/2000 | Pawelski | ............... | B60G 17/01933 92/5 R |
| 6,142,059 | A * | 11/2000 | Chan | ............... | F15B 15/2869 91/361 |
| 6,588,313 | B2 * | 7/2003 | Brown | ............... | F15B 15/2869 324/642 |
| 6,670,805 | B1 * | 12/2003 | Bahr | ............... | G01D 5/142 324/207.2 |
| 6,722,260 | B1 * | 4/2004 | Brown | ............... | F15B 15/2869 324/642 |
| 6,722,261 | B1 * | 4/2004 | Brown | ............... | F15B 15/2869 324/642 |
| 6,789,458 | B2 * | 9/2004 | Schumacher | ............... | F15B 15/2838 91/363 R |
| 6,817,252 | B2 * | 11/2004 | Wiklund | ............... | G01F 1/36 73/861.44 |
| 9,062,694 | B2 * | 6/2015 | Fletcher | ............... | F15B 15/2861 |
| 9,144,929 | B2 * | 9/2015 | Tan | ............... | B29C 45/281 |
| 9,217,448 | B2 * | 12/2015 | Kageyama | ............... | G01D 5/145 |
| 9,297,255 | B2 * | 3/2016 | Gao | ............... | E21B 49/081 |
| 9,427,905 | B2 * | 8/2016 | Tan | ............... | B29C 45/281 |
| 9,938,825 | B2 * | 4/2018 | Gao | ............... | E21B 49/08 |
| 9,938,826 | B2 * | 4/2018 | Gao | ............... | E21B 49/08 |
| 2006/0207247 | A1 * | 9/2006 | Nagai | ............... | F04B 1/128 60/413 |
| 2011/0120300 | A1 * | 5/2011 | Fletcher | ............... | F15B 15/2861 92/5 R |
| 2013/0152568 | A1 * | 6/2013 | Modderno | ............... | F04B 9/1256 60/327 |
| 2013/0152571 | A1 * | 6/2013 | Modderno | ............... | F04B 9/1256 60/413 |
| 2013/0152572 | A1 * | 6/2013 | Madderno | ............... | F04B 9/1256 60/413 |
| 2014/0163664 | A1 * | 6/2014 | Goldsmith | ............... | A61B 17/00491 623/1.11 |
| 2015/0192152 | A1 * | 7/2015 | Kageyama | ............... | G01D 5/145 324/207.12 |
| 2015/0233399 | A1 * | 8/2015 | Arntzen | ............... | F15B 15/2869 92/5 R |
| 2015/0247514 | A1 * | 9/2015 | Isobe | ............... | F15B 15/1428 92/5 R |

FOREIGN PATENT DOCUMENTS

| | | |
|---|---|---|
| WO | 2009129363 A1 | 10/2009 |
| WO | 2012015488 A1 | 2/2012 |

OTHER PUBLICATIONS

Applicant's Response to the Written Opinion of the International Searching Authority for PCT International Application No. PCT/IB2015/058746 dated Oct. 18, 2016 (4 pages).
International Preliminary Report on Patentability for PCT International Application No. PCT/IB2015/058746 dated Nov. 23, 2016 (6 pages).

* cited by examiner

FIG.10
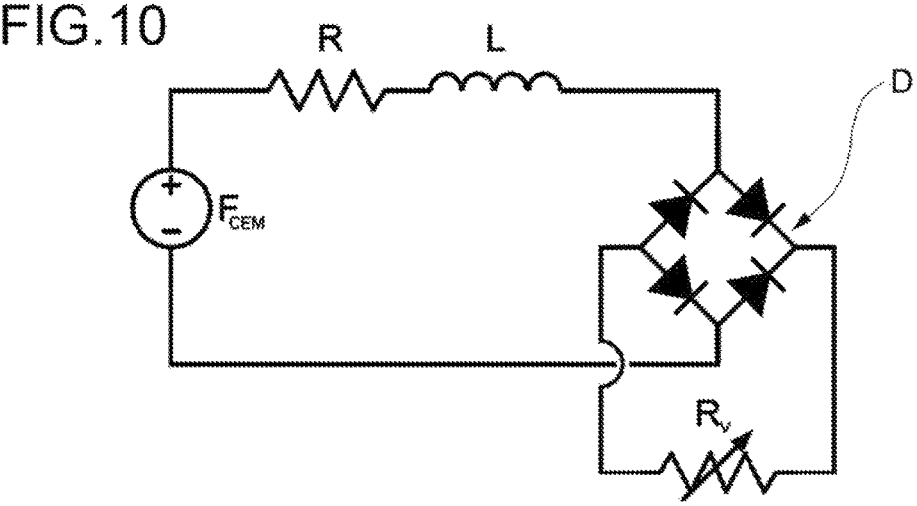
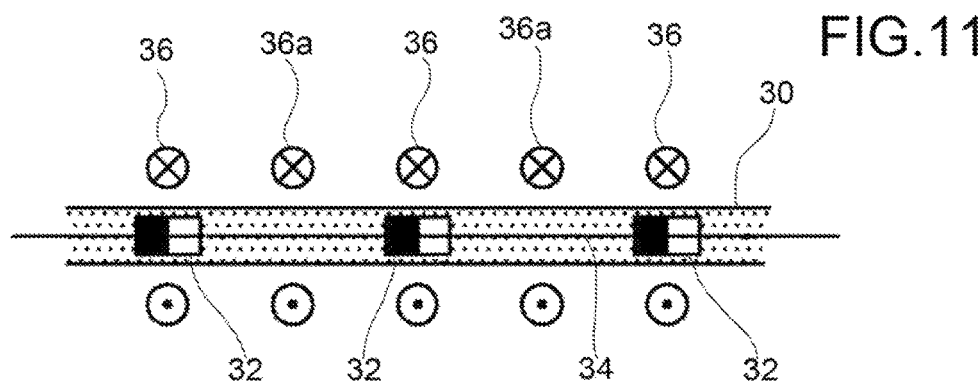
FIG.11
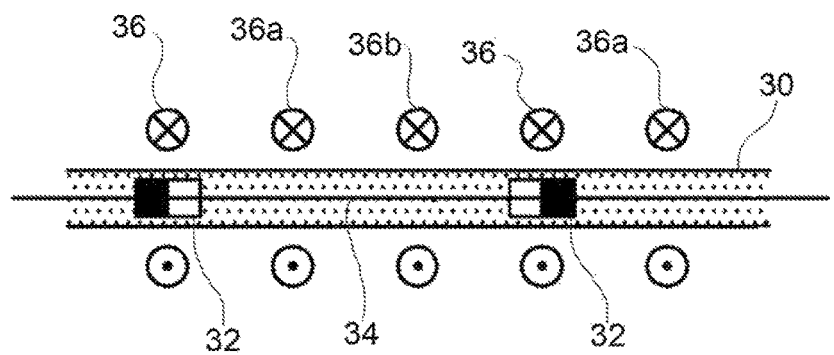
FIG.12

REGENERATIVE HYDRAULIC SHOCK-ABSORBER FOR VEHICLE SUSPENSION

CROSS-REFERENCE TO RELATED APPLICATIONS

The present application is a National Phase of International Patent Application No. PCT/IB2015/058746, filed on Nov. 12, 2015, which claims priority to and all the benefits of Italian Patent Application No. TO2014A001077, filed on Dec. 19, 2014, both of which are hereby expressly incorporated herein by reference in their entirety.

BACKGROUND OF THE INVENTION

1. Field of the Invention

The present invention concerns in general a hydraulic shock-absorber for vehicle suspension, particularly for motor vehicle suspension.

More specifically, the present invention concerns a so-called regenerative hydraulic shock-absorber, i.e. a hydraulic shock-absorber comprising a cylinder, a piston arranged slidably inside the cylinder so as to separate the space inside the cylinder into two variable-volume working chambers, and electric energy generating device for generating electric energy using the flow of a working fluid flowing into, or out of, the working chambers of the cylinder as a result of the movement of the piston in the cylinder. A hydraulic shock-absorber of this type makes it possible, therefore, to generate electric energy using the extension/compression movements of the shock-absorber, i.e. the relative movements between the wheel and the body of the vehicle, due for example to the irregularities of the road surface, to the oscillations of the vehicle body resulting from longitudinal and/or lateral acceleration, etc., besides performing the primary function of a vehicle shock-absorber, i.e. to damp the relative movements between the wheel and the body of the vehicle to guarantee the comfort of the vehicle's occupants and ensure good road-holding.

2. Description of the Related Art

In normal hydraulic shock-absorbers for vehicle suspension, i.e. in hydraulic shock-absorbers of non-regenerative type for vehicle suspension, the kinetic energy of the suspension is dissipated in the form of heat. The idea on which regenerative shock-absorbers are based is to exploit the energy which would otherwise be dissipated in the form of heat, to produce electric energy, to be used, for example, to supply devices and systems on board of the vehicle, to charge the vehicle's battery and to actively control the damping characteristics of the shock-absorber itself, ensuring at the same time the primary function of the shock-absorber.

A regenerative hydraulic shock-absorber is known, for example, from WO2009/129363 and EP1878598 and comprises a cylinder containing a hydraulic working fluid, a piston reciprocally movable inside the cylinder so as to split the cylinder into two variable-volume working chambers, a hydraulic motor, an electric generator connected to the shaft of the hydraulic motor for generating electric energy as a result of the rotation of this shaft, and a hydraulic circuit connecting the hydraulic motor to the two working chambers of the cylinder in such a way that as a result of the movement of the piston in the cylinder the working fluid flows through the hydraulic motor causing rotation of the shaft of the hydraulic motor, and thus driving the electric generator, and then returns to the cylinder.

Regenerative shock-absorbers of the type indicated above have first of all the disadvantage that their total efficiency in the conversion from kinetic energy to electric energy is significantly less than 100%, for example of the order of 30%, as a result especially of hydraulic and mechanical losses in the hydraulic motor. Furthermore, providing for each shock-absorber a hydraulic motor and an electric generator coupled thereto naturally makes the vehicle suspension system more complex, heavier and more expensive. In addition, it may be difficult to find the space required to arrange the hydraulic motor and the electric generator associated to each shock-absorber.

A regenerative hydraulic shock-absorber of the type known in the related art is described in DE 10 2008 030 577.

According to this known solution, the shock-absorber comprises a cylinder containing a hydraulic working fluid, a piston arranged slidably in the cylinder so as to split the cylinder into a first and second variable-volume working chamber, an auxiliary conduit in fluid communication on one side with the first working chamber and on the other with the second working chamber, a plurality of permanent magnets arranged slidably in the auxiliary conduit to reciprocally move along the auxiliary conduit, dragged by the working fluid flowing between the first and the second working chamber through the auxiliary conduit as a result of the reciprocating movement of the piston in the cylinder, and at least one electrical winding wound around a portion of the auxiliary conduit, in such a way that the movement of the permanent magnets along the auxiliary conduit causes the magnetic flux concatenated with the winding to change, thus generating an induced electromotive force in the winding. The auxiliary conduit has a flow cross-section whose area is less than the internal working cross-section area of the cylinder, i.e. the difference between the internal cross-section area of the cylinder and the cross-section area of the shock-absorber rod. The auxiliary conduit has an intermediate portion which extends parallel to the axis of the cylinder and has a length substantially equal to the stroke of the piston in the cylinder. Alternatively, the intermediate portion of the auxiliary conduit is inclined with respect to the axis of the cylinder.

This known solution has a series of disadvantages which make it practically unusable.

Firstly, given that the fluid flows in the auxiliary conduit with a speed equal to the speed of the piston multiplied by the ratio of the internal working cross-section area of the cylinder to the flow cross-section area of the auxiliary conduit (a ratio which in the known solution is considerably greater than one), and therefore the stroke of the magnets in the auxiliary conduit is equal to the stroke of the piston multiplied by this ratio, the magnets reach the end of their stroke in the auxiliary conduit (for example the magnet which slides along the intermediate portion of the auxiliary conduit comes to a stop against the upper end or the lower end of the conduit) well before the piston has reached the end-of-stroke position.

Secondly, since only a small number of turns of the electric windings are affected by the magnetic flux generated by the permanent magnets, the electromotive force generated by the shock-absorber is correspondingly small. Furthermore, the great length of the electric winding, equal to the length of the portion of auxiliary conduit around which the winding is arranged, entails a reduction in the electrical efficiency of the shock-absorber.

SUMMARY OF THE INVENTION

An object of the present invention is therefore to provide a regenerative hydraulic shock-absorber for vehicle suspension which is not affected by the disadvantages of the prior art discussed above. More specifically, a first object of the present invention is to provide a regenerative hydraulic shock-absorber for vehicle suspension which is capable of generating a greater electromotive force and which has a greater electrical efficiency than the prior art discussed above.

These and other objects are fully achieved according to a first aspect of the present invention by virtue of a regenerative hydraulic shock-absorber for vehicle suspension.

Advantageous embodiments of the invention form the subject-matter of the dependent claims, whose content is to be understood as an integral and integrating part of the following description.

The invention is based first of all on the idea of connecting together the permanent magnets so as to form a train of permanent magnets which moves substantially as a single body inside the auxiliary conduit, dragged by the fluid which flows from one working chamber to the other as a result of the movement of the piston in the cylinder.

According to one embodiment, the auxiliary conduit is spirally wound around the cylinder, which makes it possible to obtain an auxiliary conduit of considerably greater length than the stroke of the piston in the cylinder, and therefore to have a large multiplying effect on the speed with which the permanent magnets move in the auxiliary conduit, which results in a high electromotive force generated.

The electric energy generating device may comprise at least one electric winding wound around a portion of the auxiliary conduit, in such a way that the movement of the permanent magnets along the auxiliary conduit alters the magnetic flux concatenated with this/these winding(s), thus generating an induced electromotive force in this/these winding(s). Alternatively, the electric energy generating device may comprise a wheel magnetically coupled to the train of permanent magnets which slides along the auxiliary conduit, so as to rotate in one direction or the other as a result of the movement of the train of permanent magnets along the auxiliary conduit in one direction or the other, and an electric machine coupled to this wheel so as to be rotated by the latter.

According to a further aspect of the invention, the electric energy generating device comprise at least one electric winding wound around a portion of the auxiliary conduit, in such a way that the movement of the permanent magnets along the auxiliary conduit alters the magnetic flux concatenated with this/these winding(s), thus generating an induced electromotive force in this/these winding(s), and furthermore the auxiliary conduit is sized in such a way that the ratio of the flow cross-section area of the auxiliary conduit to the internal working cross-section area of the cylinder is equal to a given value less than one, and the ratio of the length of the auxiliary conduit to the length of the piston stroke is greater than the reciprocal of this value. Furthermore, the length of the train of permanent magnets is greater than the length of the portion of auxiliary conduit around which the at least one electrical winding is wound. This makes it possible to maximize the electromotive force generated and, at the same time, the electrical efficiency of the system. On the one hand, it ensures that all the turns of the winding are always affected by the magnetic flux, irrespective of the position of the train of permanent magnets inside the auxiliary conduit, thus maximizing the electromotive force generated. On the other hand, it limits the length, and therefore the electrical resistance, of the winding, thus maximizing the electrical efficiency.

BRIEF DESCRIPTION OF THE DRAWINGS

Further characteristics and advantages of the present invention will become more apparent from the following detailed description, given purely by way of non-limiting example with reference to the attached drawings, in which:

FIG. 10 shows an equivalent electric circuit with which a regenerative shock-absorber according to the present invention can be modelled;

FIG. 11 is a schematic illustration of an intermediate portion of the auxiliary conduit of a shock-absorber according to the present invention, with two windings arranged around the auxiliary conduit so as to create a two-phase electric circuit;

FIG. 12 is a schematic illustration of an intermediate portion of the auxiliary conduit of a shock-absorber according to the present invention, with three windings arranged around the auxiliary conduit so as to create a three-phase electric circuit;

In the description and the claims that follow, terms such as "upper" and "lower" etc. are to be understood as referring to the normal mounting condition of the shock-absorber on a vehicle, in which the cylinder of the shock-absorber is connected to a wheel mount or a suspension arm and in which the piston rod of the shock-absorber projects upwards from the cylinder and is connected to the vehicle body.

DETAILED DESCRIPTION OF THE INVENTION

Figure 2:
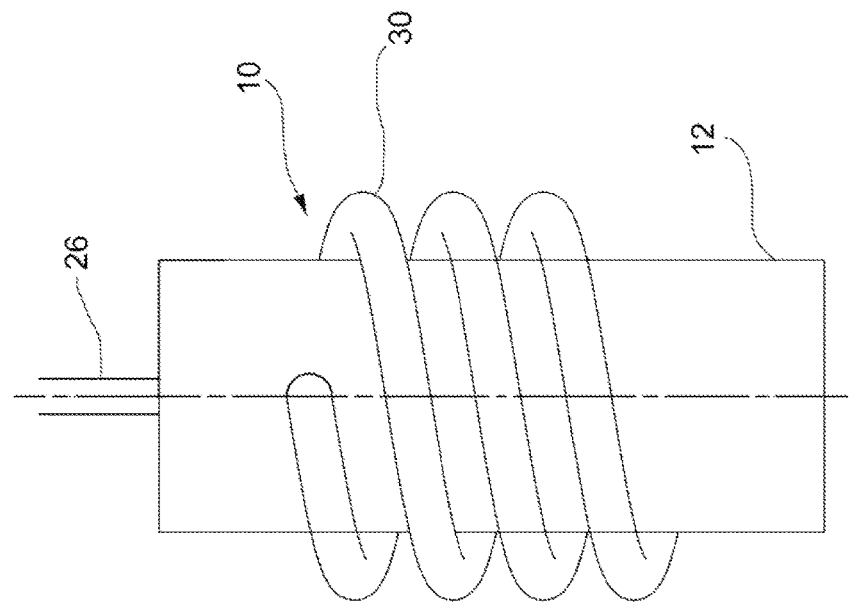
FIG. 2 is a front view of the shock-absorber of FIG. 1.
Figure 1:
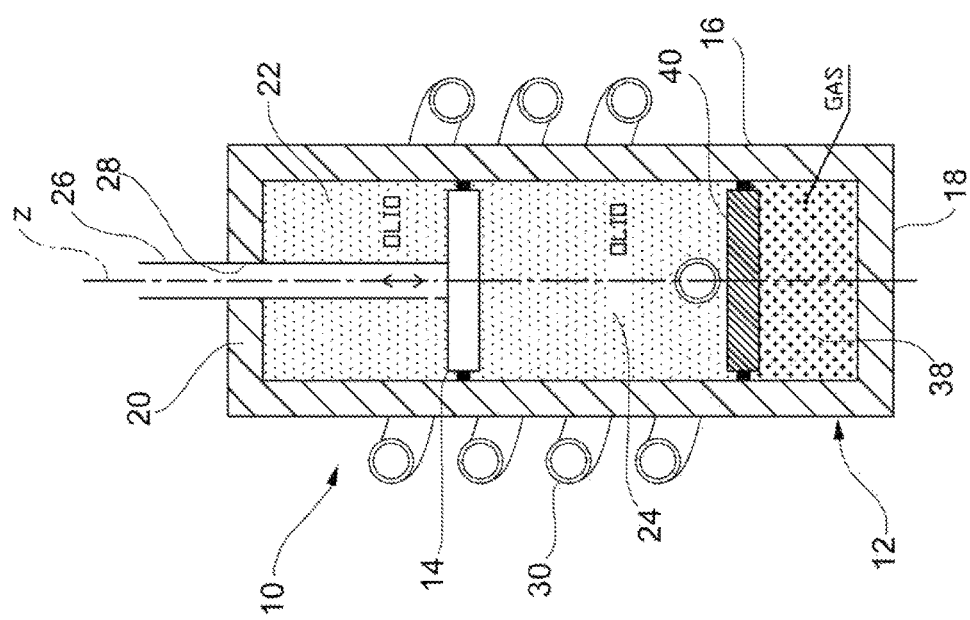
FIG. 1 is a view in axial section of a regenerative shock-absorber for vehicle suspension according to a first embodiment of the present invention.
Figures 3, 7:
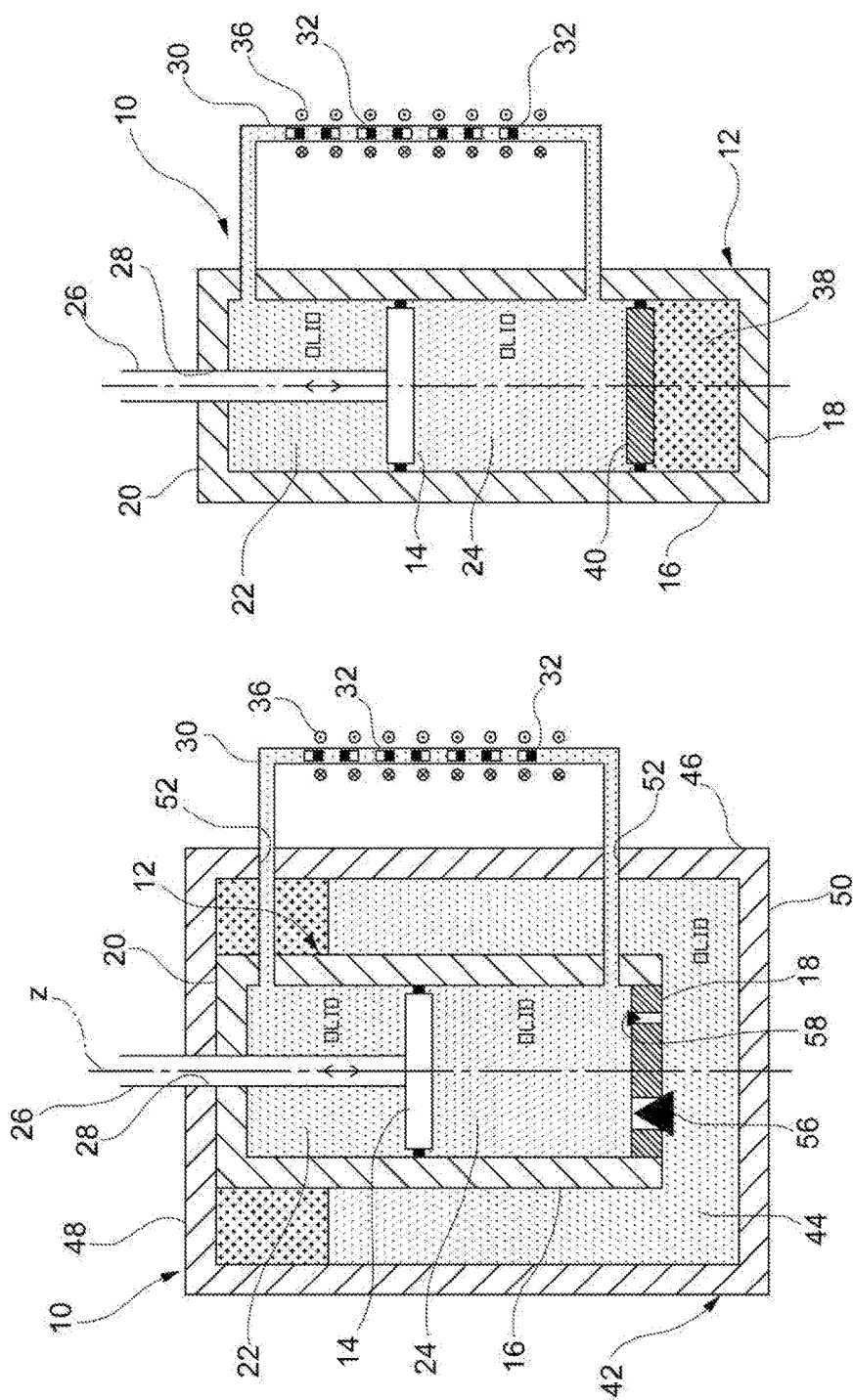
FIG. 3 is a schematic illustration of the shock-absorber of FIG. 1.
FIG. 7 is a schematic illustration of a second embodiment of a regenerative shock-absorber for vehicle suspension according to the invention.

With reference first to FIGS. 1 to 3, a regenerative shock-absorber (hereinafter simply referred to as "shock-absorber") according to a first embodiment of the present invention is generally indicated 10. The shock-absorber 10 comprises first of all, in a per-se-known manner, a cylinder 12 having a longitudinal axis z (typically oriented vertically or slightly inclined with respect to the vertical) and a piston 14 mounted slidably inside the cylinder 12 along the axis z. The cylinder 12 is filled with a hydraulic working fluid (typically oil, which proves to be an almost incompressible fluid). The cylinder 12 comprises a cylindrical lateral wall 16, a lower wall (or bottom wall) 18 and an upper closure assembly (or cap) 20. The piston 14 splits the internal volume of the cylinder 12 into two variable-volume working chambers, namely an upper working chamber, or extension chamber, 22 and a lower working chamber, or compression chamber, 24. A rod 26 is rigidly connected to the piston 14 and projects from the cylinder 12 through a hole 28 provided in the upper closure assembly 20. Suitable sealing elements (gaskets), not shown, are provided in the hole 28 to make a seal with the rod 26. The piston 14, and the rod 26 therewith, reciprocally moves along the axis z of the cylinder 12 as a result of the relative movement between the wheel of the vehicle (not shown), which is connected to the cylinder 12, and the vehicle body (also not shown), which is connected to the rod 26.

The shock-absorber 10 further comprises an auxiliary conduit 30 which is in fluid communication on the one hand with the upper working chamber 22 and on the other with the lower working chamber 24. The upwards movement of the piston 14 (the so-called extension movement of the shock-absorber) with respect to the cylinder 12 causes the working fluid to flow through the auxiliary conduit 30 from the upper working chamber 22 to the lower working chamber 24. Vice versa, the downwards movement of the piston (the so-called compression movement of the shock-absorber) with respect to the cylinder 12 causes the working fluid to flow through the auxiliary conduit 30 from the lower working chamber 24 to the upper working chamber 22.

Preferably, as shown in FIGS. 1 and 2, the auxiliary conduit 30 is spirally wound around the lateral wall 16 of the cylinder 12. Such a shape, in fact, makes it possible to have an auxiliary conduit of great length, without this leading to an excessive increase in the radial size of the shock-absorber. The auxiliary conduit 30 preferably has a transverse cross-section (fluid flow cross-section) of circular shape. Furthermore, the flow cross-section area of the auxiliary conduit 30 is less than the internal working cross-section area of the cylinder 12 (equal to the difference between the internal cross-section area of the cylinder and the cross-section area of the rod), for example comprised between 5% and 25% of the internal working cross-section area of the cylinder 12. This makes it possible to have in the auxiliary conduit 30 a flow with a speed significantly greater than the speed with which the piston 14 slides in the cylinder 12, as the speed is inversely proportional to the cross-section area. In the case for example of an auxiliary conduit 30 having a cross-section area equal to 1/20 of the internal working cross-section area of the cylinder 12, the fluid flow inside the auxiliary conduit 30 will have a speed equal to 20 times the relative speed of the piston 14 with respect to the cylinder 12.

Figure 4:
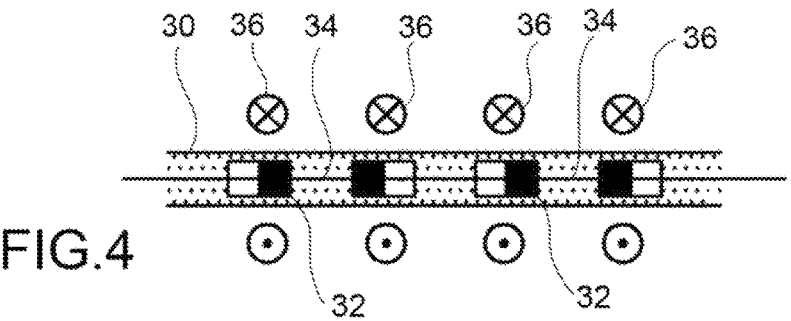
FIG. 4 is a schematic illustration of an intermediate portion of the auxiliary conduit of a shock-absorber according to the present invention.
Figure 6:
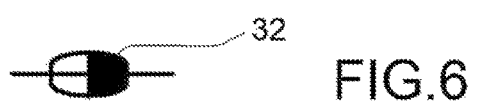
FIG. 6 shows an alternative form of permanent magnet that may be used in a shock-absorber according to the present invention.

The shock-absorber 10 further comprises a train of permanent magnets 32 received in the auxiliary conduit 30 so as to slide along this conduit, dragged by the working fluid flowing between the upper working chamber 22 and the lower working chamber 24 as a result of the movement of the piston 14 in the cylinder 12. With reference in particular to FIG. 4, which shows in section a portion (straightened) of the auxiliary conduit 30, the permanent magnets 32 are arranged one behind the other with opposed polarities. The permanent magnets 32 are connected to each other, for example by a flexible mesh 34 (shown only schematically in FIG. 4) of polymer material which encloses the permanent magnets 32. In this way, the pitch between the permanent magnets 32, i.e. the distance between two adjacent magnets, is kept constant. To this end, spacers may also be provided between each pair of adjacent magnets. Preferably, as shown in FIG. 4, the permanent magnets 32 have the shape of a straight cylinder with a diameter substantially equal (apart from the minimal play necessary to allow the permanent magnets in the auxiliary conduit to move) to the internal diameter of the auxiliary conduit 30. Alternatively, as shown in FIG. 6, the permanent magnets 32 may have a barrel shape, with a maximum diameter substantially equal to the internal diameter of the auxiliary conduit 30. The permanent magnets 32 are preferably made as hollow elements so that they have reduced inertia.

The train of permanent magnets 32 moves therefore as a single body along the auxiliary conduit 30 substantially at the same speed as that of the working fluid flowing along this conduit, which speed is a multiple of the speed of the piston 14 relative to the cylinder 12, as already mentioned above. In order to ensure that the train of permanent magnets 32 remains confined inside the auxiliary conduit 30 during its movement, the ratio of the length of the auxiliary conduit 30 to the length of the stroke of the piston 14 must be greater than the reciprocal of the ratio of the flow cross-section area of the auxiliary conduit 30 to the internal working cross-section area of the cylinder 12. This condition may be achieved even in the case of a small ratio of the flow cross-section area of the auxiliary conduit 30 to the internal working cross-section area of the cylinder 12, for example by winding the auxiliary conduit 30 spirally around the cylinder 12.

Figure 5A:
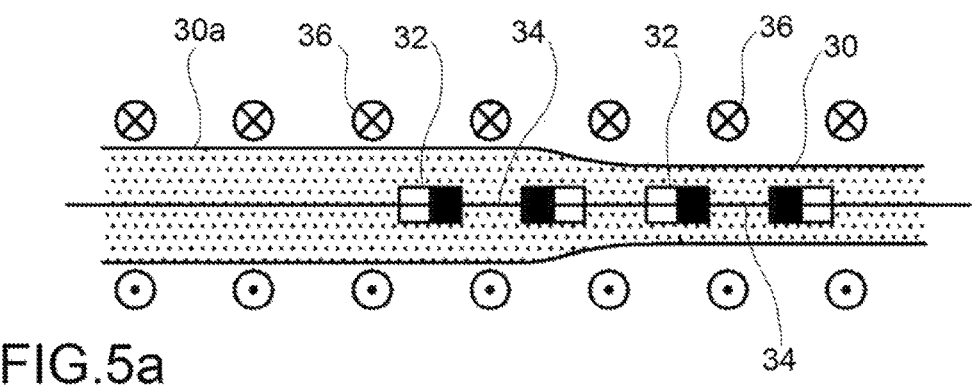
FIG. 5a is a schematic illustration of an end portion of the auxiliary conduit of a shock-absorber according to the present invention.
Figure 5B:
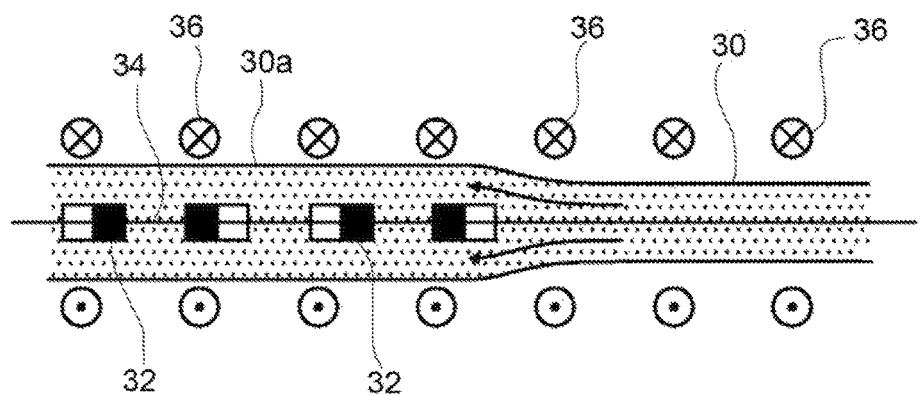
FIG. 5b is another schematic illustration of an end portion of the auxiliary conduit of a shock-absorber according to the present invention.

With reference to FIGS. 5a and 5b, the end portions of the auxiliary conduit 30 (only one of which is shown in FIGS. 5a and 5b, where it is indicated 30a) have a larger diameter than the remaining part of the auxiliary conduit 30, so as to allow the working fluid to flow through the auxiliary conduit 30 in the event that the train of permanent magnets 32 is stationary, because it has reached an end-of-stroke position, adjacent to an end portion of this conduit.

As is shown schematically in FIGS. 3, 4, 5a and 5b, an electrical winding 36 (coil) is arranged around the auxiliary conduit 30. The movement of the train of permanent magnets 32 along the auxiliary conduit 30 causes variations in the magnetic flux of the permanent magnets 32 concatenated with the winding 36, and therefore generates in this winding an induced electromotive force whose intensity is proportional to the speed of the train of permanent magnets 32. As already stated above, the speed of the train of permanent magnets 32 corresponds to the speed of the fluid along the auxiliary conduit 30, a speed which is equal to the speed of the piston 14 multiplied by the reciprocal of the ratio of the flow cross-section area of the auxiliary conduit 30 to the internal working cross-section area of the cylinder 12. Setting a ratio between these areas less than 1 allows to obtain a multiplication effect on the speed of the train of permanent magnets 32 in the auxiliary conduit 30 with respect to the speed of the piston 14, and therefore an increase in the electromotive force generated in the winding 36. According to this embodiment, the winding 36 arranged around the auxiliary conduit 30 acts as an electrical energy generating device which generates electrical energy by exploiting the movement of the train of permanent magnets 32 along the auxiliary conduit 30 resulting from the movement of the piston 14 relative to the cylinder 12.

Figure 15:
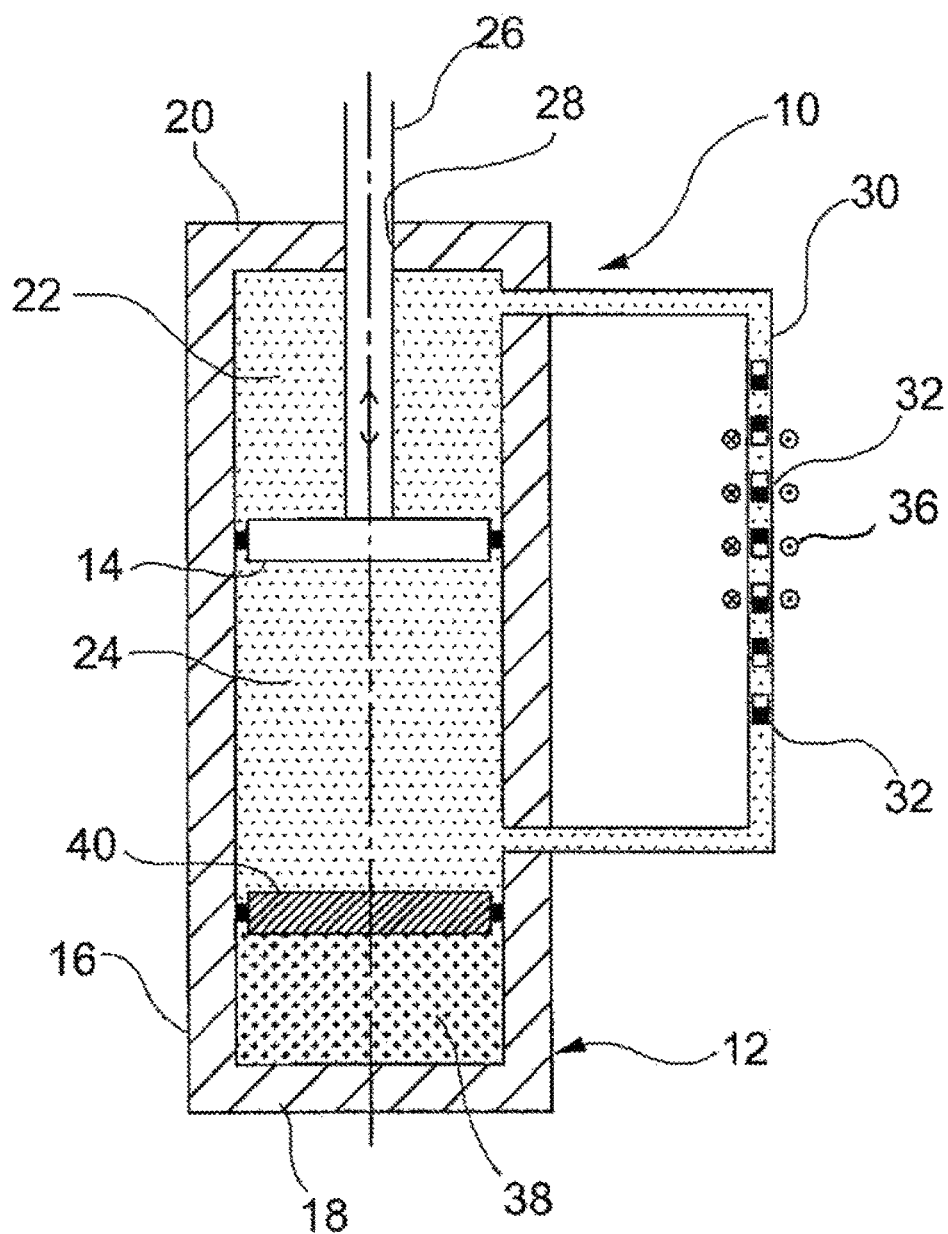
FIG. 15 is a schematic illustration of a regenerative shock-absorber for vehicle suspension according to a further embodiment of the present invention.

According to one embodiment of the invention (as shown in FIG. 15), the length of the train of permanent magnets 32 is greater than the length of the portion of auxiliary conduit 30 around which the winding 36 is arranged. This makes it possible to maximize the electromotive force generated and, at the same time, the electrical efficiency of the system. On the one hand, it ensures that all the turns of the winding 36 are always affected by the magnetic flux, irrespective of the position of the train of permanent magnets 32 inside the auxiliary conduit 30, thus maximizing the electromotive force generated. On the other, it limits the length, and therefore the electrical resistance, of the winding, thus maximizing the electrical efficiency.

In all cases where the rod 26 of the piston 14 projects on one side only (typically the upper side) of the cylinder 12, it is necessary to provide a reservoir filled with compressible fluid (gas) to compensate for the variation in the volume of oil in the cylinder which occurs when the piston moves inside the cylinder, due to the fact that, on each occasion, a certain volume of the rod, equal to the product of the cross-section area of the rod multiplied by the stroke travelled by the piston and rod assembly, enters the inside of the cylinder (compression movement) or leaves the cylinder (extension movement).

In the embodiment of FIGS. 1-3, the gas reservoir is indicated 38 and is provided in the lower part of the cylinder 12. More specifically, the gas reservoir 38 is delimited laterally by the lateral wall 16 of cylinder 12, at its bottom by the bottom wall 18 of the cylinder 12 and at its top by a separating member 40 which is freely slidably mounted along the lateral wall 16 of the cylinder 12 and which separates the gas (at high pressure, for example at 15-20 bar) contained in the reservoir 38 from the oil contained in the lower working chamber 24. According to this embodiment, therefore, the shock-absorber 10 has an architecture similar to that of a traditional single-tube shock-absorber. However, unlike the case of a traditional single-tube shock-absorber, in which the piston is provided with a pair of one-way valves, namely a compression valve and a rebound (or extension) valve, arranged so as to put into communication with each other the upper working chamber and the lower working chamber of the cylinder during the movement of the piston along the cylinder, in the embodiment of FIGS. 1-3 there is no need for one-way valves fitted to the piston, since the function of communication between the upper working chamber 22 and the lower working chamber 24 is already performed by the auxiliary conduit 30, and the piston 14 is therefore a blind one. This embodiment is thus constructionally simple and furthermore is able to operate in any orientation, in particular even when it is oriented horizontally or 180° upside down, since the oil and the gas are physically separated from each other by the separating member 40.

According to the embodiment of FIG. 7, in which parts and elements identical or corresponding to those of the embodiment of FIGS. 1-3 have been indicated with the same reference numbers, the shock-absorber 10 has an architecture similar to that of a traditional double-tube shock-absorber, in that the cylinder 12 (operating as an inner tube) is housed inside an outer tube 42. In this case, the gas reservoir is constituted by the gap, indicated 44, between the cylinder 12 and the outer tube 42. The gap 44 contains oil in its lower part, while in its upper part it contains gas at low pressure, for example at 3-4 bar. The oil and gas contained in the gap 44 are in direct contact with each other. The outer tube 42 comprises a cylindrical lateral wall 46, an upper closure assembly (or cap) 48 and a lower wall, or bottom wall, 50. The cylindrical lateral wall 46 of the outer tube 42 has holes 52 through which the auxiliary conduit 30, which is preferably spirally wound around the outer tube 42, passes. The upper closure assembly 48 has a hole 28 through which the rod 26 extends. The lower wall 50 of the outer tube 42 is spaced apart from the lower wall 18 of the cylinder 12. Between these two parts there is always the oil contained in the lower part of the gap 44. The lower wall 18 of the cylinder 12, like in a traditional double-tube architecture, is provided with a compression valve 56 and an intake valve 58. As may be seen, the invention is easily applicable to a double-tube architecture, which is the most widespread architecture for mass-produced car applications indeed.

Figure 8:
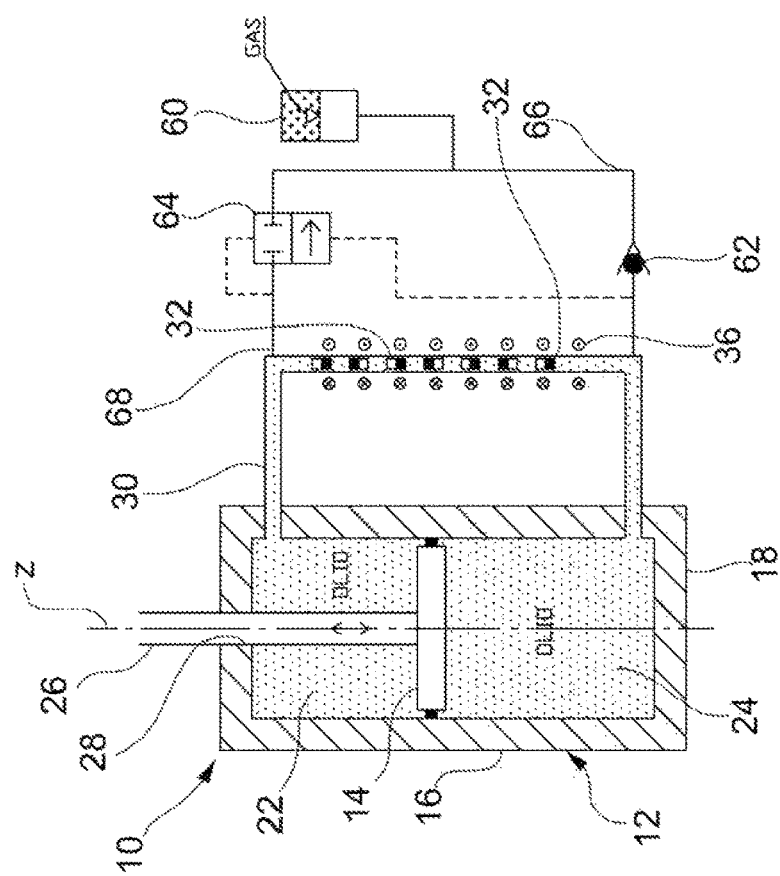
FIG. 8 is a schematic illustration of a third embodiment of a regenerative shock-absorber for vehicle suspension according to the invention.

According to the embodiment shown in FIG. 8, where parts and elements identical or corresponding to those of the embodiment of FIGS. 1-3 have been given the same reference numbers, a reservoir 60 is provided which is located outside the cylinder 12 and contains gas at low pressure (3-4 bar) in its upper part and oil in its lower part. The reservoir 60 is connected to the auxiliary conduit 30 via a hydraulic circuit containing a plurality of passive valves such that the reservoir 60 is always connected to the low pressure side of the auxiliary conduit 30, irrespective of whether the piston 14 and rod 26 assembly is moving in extension or in compression. This plurality of passive valves comprises at least a non-return valve 62 and a two-way flow control valve 64. The non-return valve 62 is arranged along a line 66 which connects the reservoir 60 to the side of the auxiliary conduit 30 which leads to the lower working chamber 24 and enables the oil to flow only in the direction from the reservoir 60 to the auxiliary conduit 30. The flow control valve 64 is arranged along a line 68 which connects the reservoir 60 to the side of the auxiliary conduit 30 which leads to the upper working chamber 22. The flow control valve 64 is piloted by the difference between the pressures in the two working chambers 22 and 24 of the cylinder 12. In the extension phase, the flow control valve 64 is in the closed position, as a result of the difference in pressure between the two working chambers 22 and 24 of the cylinder 12, and the oil flows from the reservoir 60 to the lower working chamber 24 along the line 66, passing through the non-return valve 62. In the extension phase, the flow control valve 64 is in the closed position, as a result of the difference in pressure between the two working chambers 22 and 24 of the cylinder 12, and the oil flows from the auxiliary conduit 30 to the reservoir 60 along the line 68, passing through the non-return valve 64.

Figure 9:
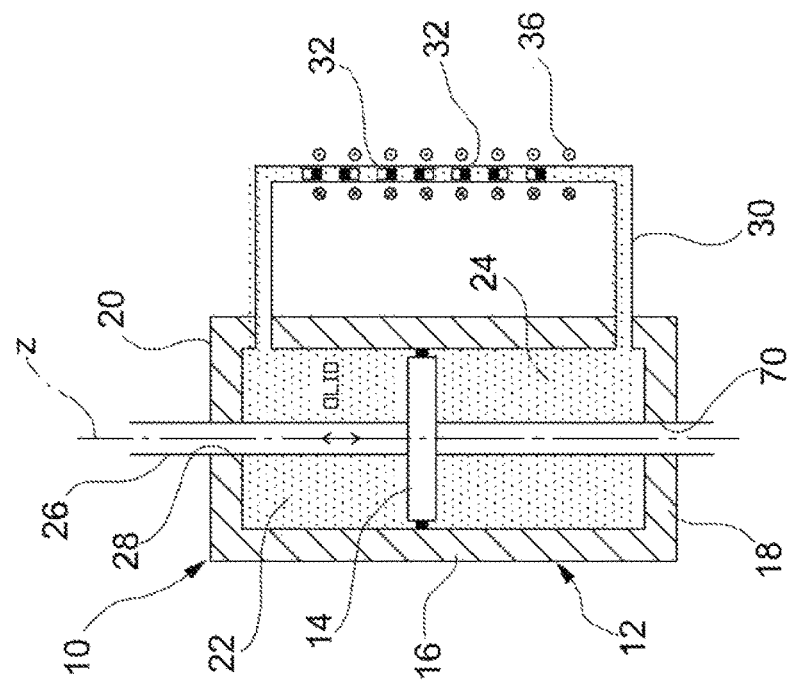
FIG. 9 is a schematic illustration of a fourth embodiment of a regenerative shock-absorber for vehicle suspension according to the invention.

According to the embodiment shown in FIG. 9, where parts and elements identical or corresponding to those of the embodiment of FIGS. 1-3 have been given the same reference numbers, the rod 26 is a through rod, in that it extends both through the upper closure assembly 20 of the cylinder 12, passing through the hole 28 provided therein, and through the lower wall 18, passing through a hole 70 provided therein. In this case, a gas reservoir is not necessary.

All the embodiments described above enable therefore to generate electric energy by inducing an electric current in a winding surrounding an auxiliary conduit which is in fluid communication with the two working chambers of the cylinder and along which a train of permanent magnets moves with reciprocating motion, dragged by the working fluid which flows from one working chamber to the other as a result of the reciprocating movement of the piston relative to the cylinder.

As is shown in FIG. 10, the shock-absorber 10 described above can be modelled with an equivalent electric circuit, in which the assembly formed by the cylinder 12 and the piston 14 is represented by a counter-electromotive force $F_{CEM}$, while the winding 36 arranged around the auxiliary conduit 30 is represented by a resistance R and an inductance L. This circuit is interfaced with a diode bridge or a controlled synchronous rectifier D, capable of rectifying the voltage signal, and with a variable resistance $R_V$, which in turn models a conversion device capable of recovering the electric energy. This conversion device includes a controllable equivalent input resistance equal to $R_V$, whose value determines the intensity of the reaction force with which the train of permanent magnets 32 opposes the movement of the piston 14, and thus determines the damping characteristics of the shock-absorber. By adjusting the value of the resistance $R_V$ using suitable power electronics, it is therefore possible to obtain the desired damping curves (force-speed curves) for control of the vehicle dynamics (comfort and road-holding).

The configuration shown for example in FIG. 4, with a single winding 36 arranged around the auxiliary conduit 30, is a single phase configuration. It is, however, possible to obtain a two-, three- or more phase system, by arranging more windings around the auxiliary conduit 30 with suitable spatial relocation of the permanent magnets in order to minimize the torque and current ripple. FIG. 11 shows, for example, a two-phase configuration, with a first winding 36 (first phase) and a second winding 36a (second phase), wound alternately around the auxiliary conduit 30. FIG. 12, on the other hand, shows a three-phase configuration, with a first winding 36 (first phase), a second winding 36a (second phase) and a third winding 36b (third phase), wound alternately around the auxiliary conduit 30.

The windings coming from the shock-absorber may be connected in various ways, all of which are known. The windings may, for example, all be connected in series, or all in parallel, according to a fixed configuration of connections in series and in parallel, or again according to a variable configuration of connections in series and in parallel.

Figure 14:
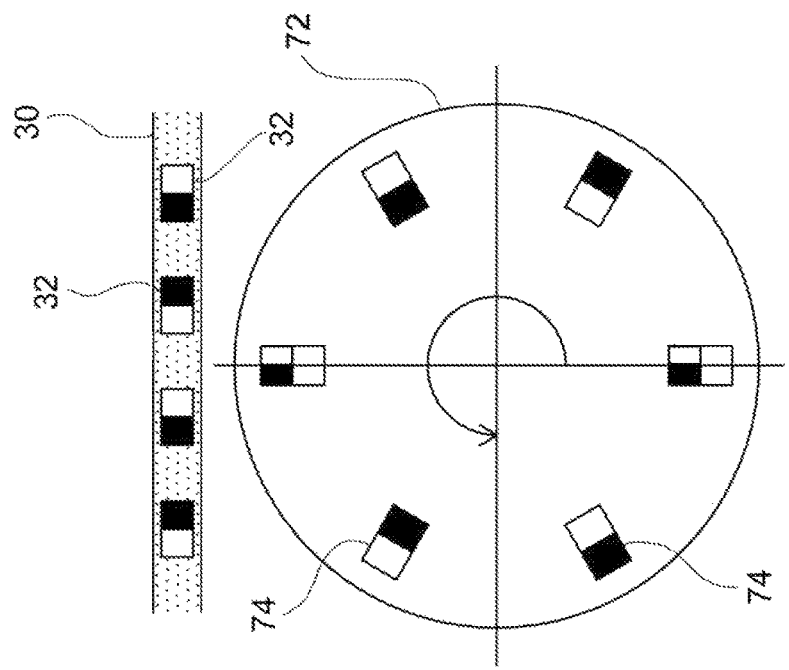
FIG. 14 shows schematically an alternative example of electric energy generating device suitable for generating electric energy using the movement of the train of permanent magnets along the auxiliary conduit of a shock-absorber according to the present invention.
Figure 13:
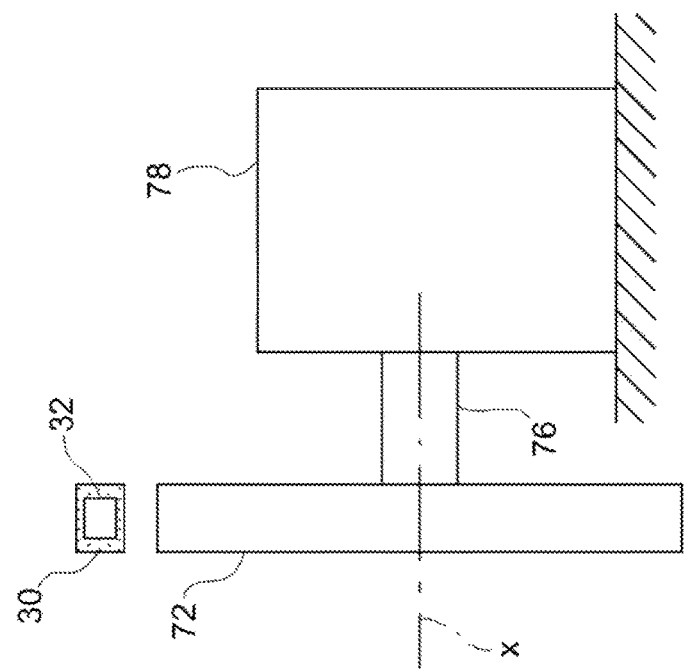
FIG. 13 shows schematically an example of electric energy generating device suitable for generating electric energy using the movement of the train of permanent magnets along the auxiliary conduit of a shock-absorber according to the present invention.

With reference, finally, to FIGS. 13 and 14, according to a variant of the present invention the electric energy is generated not by arranging one or more windings around the auxiliary conduit along which the train of permanent magnets 32 moves, as in the embodiments described above, but by driving in rotation, by the train of permanent magnets 32, a wheel 72 which is provided with permanent magnets 74 and is mechanically coupled, for example by a shaft 76, to an electric machine 78. In this way a contactless motion transmission mechanism is obtained, similar to a rack-and-pinion mechanism, in which the train of permanent magnets 32 acts as the rack and the wheel 72 with the permanent magnets 74 acts as the pinion. The reciprocating motion of the train of permanent magnets 32 along the auxiliary conduit 30 in this case produces reciprocating rotation of the wheel 72 around its axis (indicated x in FIG. 13) and thus electric energy generation by the electric machine 78 operating as a generator.

The regenerative hydraulic shock-absorber of the present invention may also be used actively by supplying electric power to the coils, and therefore transmitting force and mechanical work to the train of permanent magnets.

Naturally, the principle of the invention remaining unchanged, the embodiments and the constructional details may vary widely from those described and illustrated purely by way of non-limiting example, without thereby departing from the scope of the invention as defined in the appended claims.

The invention claimed is:

1. A regenerative hydraulic shock-absorber for vehicle suspension, comprising:
   a cylinder containing a hydraulic working fluid;
   a piston slidably arranged in the cylinder so as to split the cylinder into two variable-volume working chambers, namely a first working chamber, or extension chamber, and a second working chamber, or compression chamber;
   an auxiliary conduit in fluid communication on the one hand with the first working chamber and on the other with the second working chamber;
   a plurality of permanent magnets slidably arranged in the auxiliary conduit to reciprocate along the auxiliary conduit, dragged by the working fluid flowing between the first and second working chambers through the auxiliary conduit as a result of the reciprocating motion of the piston in the cylinder; and
   an electric energy generating device for generating electric energy from the movement of the permanent magnets along the auxiliary conduit;
   wherein the auxiliary conduit is spirally wound around the cylinder, and
   wherein the permanent magnets are connected to each other so as to form a train of permanent magnets.

2. The shock-absorber as set forth in claim 1, wherein the permanent magnets are arranged one behind the other with opposed polarities and are connected to each other with a constant magnetic and mechanical pitch.

3. The shock-absorber as set forth in claim 1, further comprising a rod, which is rigidly connected to the piston and projects from the cylinder on one side of the latter only, and a reservoir, which is at least partially filled with a compressible fluid and acts to compensate for changes in the volume of the working fluid inside the cylinder occurring as a result of the movement of the assembly formed by the piston and the rod relative to the cylinder.

4. The shock-absorber as set forth in claim 3, wherein said reservoir is formed by a chamber located inside the cylinder between a bottom wall of the cylinder and a separating member which is freely slidable in the cylinder, the separating member separating the reservoir from the second working chamber of the cylinder.

5. The shock-absorber as set forth in claim 3, further comprising an outer tube inside which the cylinder is housed and from which the rod projects, wherein said reservoir is formed by a gap between the cylinder and the outer tube, which gap contains the working fluid in its lower part and the compressible fluid in its upper part, and wherein a first non-return valve, or compression valve, arranged to allow the working fluid to flow only in the direction from the second working chamber of the cylinder to the gap and a second non-return valve, or intake valve, arranged to allow the working fluid to flow only in the direction from the gap to the second working chamber of the cylinder are provided in the bottom wall of the cylinder.

6. The shock-absorber as set forth in claim 3, wherein said reservoir is formed by an external reservoir which is arranged outside the cylinder and contains in part the working fluid and in part the compressible fluid, the external reservoir being connected to the auxiliary conduit via a hydraulic circuit comprising a plurality of passive valves wherein the external reservoir is always connected to the low-pressure side of the auxiliary conduit.

7. The shock-absorber as set forth in claim 1, further comprising a rod which is rigidly connected to the piston and projects from the opposite sides of the cylinder.

8. The shock-absorber as set forth in claim 1, wherein said electric energy generating device comprises at least one electric winding arranged around a portion of the auxiliary conduit, whereby movement of the train of permanent magnets along the auxiliary conduit causes the magnetic flux concatenated with said at least one winding to change and thus an induced electromotive force to be generated in said at least one winding.

9. The shock-absorber as set forth in claim 8, wherein said at least one electric winding is connected to a conversion device arranged to recover electric energy, the conversion device including a controllable equivalent input resistance, the value of said equivalent input resistance determining the intensity of the reaction force with which the train of permanent magnets opposes the motion of the piston, in such a way that desired damping curves of the shock-absorber are obtainable by adjusting the value of said equivalent input resistance.

10. The shock-absorber as set forth in claim 8, wherein the train of permanent magnets has a length greater than that of the portion of auxiliary conduit around which said at least one electric winding is wound.

11. The shock-absorber as set forth in claim 1, wherein said electric energy generating device comprises a wheel that is magnetically coupled to the train of permanent magnets so as to rotate in one direction or the other as a result of the movement of the train of permanent magnets along the auxiliary conduit in one direction or the other, and an electric machine mechanically coupled to said wheel so as to be rotated by the latter.

12. The shock-absorber as set forth in claim 1, wherein the ratio of the flow cross-section area of the auxiliary conduit to the internal working cross-section area of the cylinder is equal to a given value less than 1 and wherein the ratio of the length of the auxiliary conduit to the length of the stroke of the piston is greater than the reciprocal of said value.

13. A regenerative hydraulic shock-absorber for vehicle suspension, comprising:
a cylinder containing a hydraulic working fluid;
a piston slidably arranged in the cylinder so as to split the cylinder into two variable-volume working chambers, namely a first working chamber, or extension chamber, and a second working chamber, or compression chamber;
an auxiliary conduit in fluid communication on the one hand with the first working chamber and on the other with the second working chamber;
a plurality of permanent magnets slidably arranged in the auxiliary conduit to reciprocate along the auxiliary conduit, dragged by the working fluid that flows between the first and second working chambers through the auxiliary conduit as a result of the reciprocating motion of the piston in the cylinder; and an electric energy generating device for generating electric energy from the movement of the permanent magnets along the auxiliary conduit, said electric energy generating device comprising at least one electric winding wound around a portion of the auxiliary conduit, in such a way that the movement of the permanent magnets along the auxiliary conduit causes the magnetic flux concatenated with said at least one winding to change, thus generating an induced electromotive force in said at least one winding;
wherein the ratio of the flow cross-section of the auxiliary conduit to the internal working cross-section area of the cylinder is equal to a given value less than 1;
wherein the ratio of the length of the auxiliary conduit to the length of the stroke of the piston is greater than the reciprocal of said value, the permanent magnets are connected to each other so as to form a train of permanent magnets, and
the length of the train of permanent magnets is greater than the length of the portion of auxiliary conduit around which said at least one electric winding is wound.

14. The shock-absorber as set forth in claim 13, wherein the auxiliary conduit is spirally wound around the cylinder.

15. The shock-absorber as set forth in claim 13, wherein the permanent magnets are arranged one behind the other with opposed polarities and are connected to each other with a constant magnetic and mechanical pitch.

16. The shock-absorber as set forth in claim 13, further comprising a rod, which is rigidly connected to the piston and projects from one side only of the cylinder, and a reservoir, which is at least partially filled with a compressible fluid and acts to compensate for changes in the volume of the working fluid inside the cylinder occurring as a result of the movement of the assembly formed by the piston and the rod relative to the cylinder.

17. The shock-absorber as set forth in claim 16, wherein said reservoir is formed by a chamber located inside the cylinder between a bottom wall of the cylinder and a separating member mounted freely slidable in the cylinder, the separating member separating the reservoir from the second working chamber of the cylinder.

18. The shock-absorber as set forth in claim 16, further comprising an outer tube inside which the cylinder is received and from which the rod projects, wherein said reservoir is formed by a gap between the cylinder and the outer tube, which gap contains the working fluid in its lower part and the compressible fluid in its upper part, and wherein a first non-return valve, or compression valve, arranged to allow the working fluid to flow only in the direction from the second working chamber of the cylinder to the gap and a second non-return valve, or intake valve, arranged to allow the working fluid to flow only in the direction from the gap to the second working chamber of the cylinder are provided in the bottom wall of the cylinder.

19. The shock-absorber as set forth in claim 16, wherein said reservoir is formed by an external reservoir which is arranged outside the cylinder and contains in part the working fluid and in part the compressible fluid, the external reservoir being connected to the auxiliary conduit via a hydraulic circuit comprising a plurality of passive valves wherein the external reservoir is always connected to the low-pressure side of the auxiliary conduit.

20. The shock-absorber as set forth in claim 13, further comprising a rod which is rigidly connected to the piston and projects from the opposite sides of the cylinder.

21. The shock-absorber as set forth in claim 13, wherein said at least one electric winding is connected to a conversion device arranged to recover electric energy, said conversion device including a controllable equivalent input resistance, the value of said controllable equivalent input resistance determining the intensity of the reaction force with which the train of permanent magnets opposes the motion of the piston, in such a way that desired damping curves of the shock-absorber are obtainable by adjusting the value of said equivalent input resistance.

* * * * *